3,366,888
DC AMPLIFIER STABILIZATION CIRCUIT
Masao Kawashima, Yokohama-shi, Tsukumo Higeta and Gen Kakehi, Kawasaki-shi, and Yukihiko Minejima, Tokyo, Japan, assignors to Fujitsu Limited, Kawasaki, Japan, a corporation of Japan
Filed May 25, 1965, Ser. No. 458,790
Claims priority, application Japan, June 1, 1964, 39/30,839
4 Claims. (Cl. 330—9)

ABSTRACT OF THE DISCLOSURE

A circuit samples the output signal of a DC amplifier during a time slot of no information, thereby sampling the noise component and the high frequency signal component from the output signal. The high frequency signal component is eliminated from the sampled output signal and the noise component of the sampled output signal is applied to the input of the amplification stage of the DC amplifier.

Figure 1:
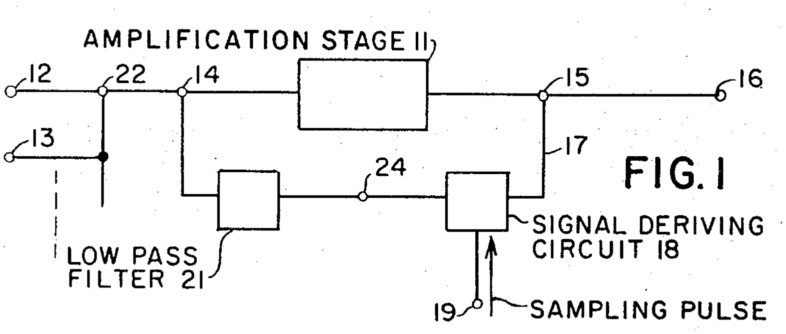

The present invention relates to a DC amplifier stabilization circuit. More particularly, the invention relates to a stabilization circuit for a broad band DC amplifier.

In a broad band DC amplifier, in which the broad band includes a DC, the parameters of the amplifying components vary due to variation of temperature, power supply, aging, random noise such as thermal resistance noise, and the like. The variation of the parameters of the amplifying components cause the operating point of the amplifier to vary in a phenomenon known as DC drift. Since these variations are considerably greater than random noise, it may be said that the signal to noise ratio of the amplifier, as well as the precision of operation and constancy of operation of the amplifier are determined primarily by the DC drift.

In a feedback analog-digital converter, for example, an input analog signal to be converted and a square wave voltage are added or subtracted by an adding amplifier in order to provide high precision comparative operation and detection. Furthermore, the sum or difference signal is amplified up to the predetermined level or magnitude necessary for detection. The adding amplifier which performs the addition and substratcion must be a DC adding amplifier, since the square wave reference voltage input signal is a asymmetrical signal including a DC component. Thus, low frequency noise, including variation of the operating point, DC drift, and the like, in such a DC adding amplifier, which amplifies the signal including the DC, lessen the precision of conversion and constancy of the analog-digital converter.

Various methods for stabilizing the operating point of an amplifier include offsetting the operating current and voltage by utilization of suitable temperature-responsive components such as, for example, diodes, transistors, thermistors or the like, or operating as a differential ampli fier by utilization of a pair of active components having the same parameters. If the temperature-responsive components or the pair of active components are selected with care, the stabilizing effect of these methods may be satisfactory. However, as soon as the circuit is unbalanced there is no stabilizing effect at all. Furthermore, great expense is entailed in precise selection of the circuit components.

The principal object of the present invention is to provde a new and improved DC amplifier stabilization circuit.

An object of the present invention is to provide a DC amplifier stabilization circuit which stabilizes the operating point of the amplifier with precision, efficiency and reliability.

Another object of the present invention invention is to provide a DC amplifier stabilization circuit which stabilizes the operating point of the amplifier against variation of temperature, power supply and aging characteristics.

Another object of the present invention is to provide a DC amplifier stabilization circuit which is not susceptible to the shortcomings of prior art stabilization circuits.

Another object of the present invention is to provide a DC amplifier stabilization circuit which eliminates low frequency noise.

In accordance with the present invention, the DC drift component is derived from a low frequency noise signal beyond the time period of the output signal of the amplification stage and is applied to the input of the amplification stage, to stabilize the operating point of a DC amplifier.

Figure 3:
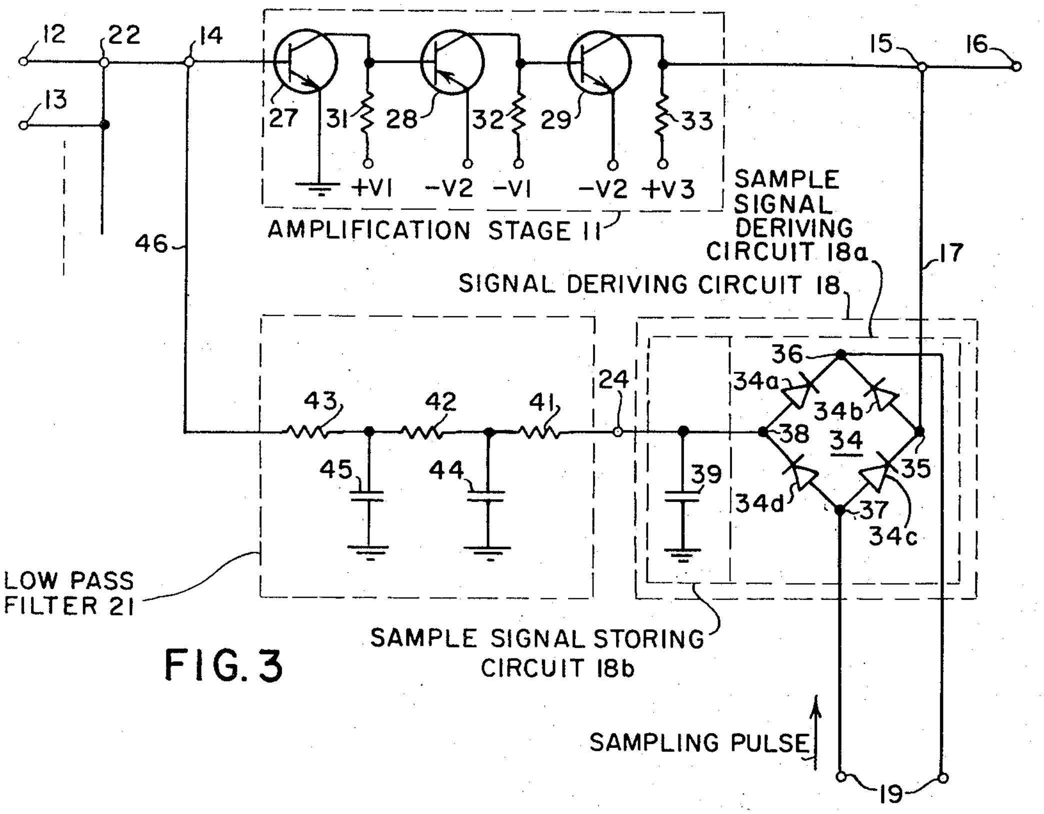

In order that the present invention may be readily carried into effect, it will now be described with reference to the accompanying drawings, wherein:

FIG. 1 is a schematic block diagram of an embodiment of the DC amplifier stabilization circuit of the present invention;

FIGS. 2*a*, 2*b*, 2*c*, 2*d*, 2*e*, and 2*f* are graphical presentations of waveshapes appearing at various points in the arrangement of FIG. 1; and FIG. 3 is a schematic circuit diagram of the embodiment of FIG. 1.

In the figures, the same components are identified by the same reference numerals.

In accordance with the present invention, a DC amplifier is stabilized by an arrangement which is entirely different from the temperature-responsive component or pair of similar active components arrangements hereinbefore discussed. A sample value feedback is provided in the form of a low frequency noise signal which is beyond the time period and frequency band of the amplifier. Since the stabilization circuit of the present invention is therefore not effected by the precision or constancy of components, as in the aforediscussed arrangements, said stabilization circuit provides effective, efficient, reliable, accurate and precise stabilization of the operating point of an amplifier against variations in temperature, power supply, aging characteristics, and the like.

In FIG. 1, input signals are supplied to an amplification stage 11 via input signal terminals 12, 13 and so on, and an input 14. Output signals are derived from the amplification stage 11 via an output 15 and an output signal terminal 16. The DC amplifier or amplification stage 11 comprises active amplifier components such as, for example, transistors. The amplification stage 11 is provided with a shunt feedback loop 17 connected between the output 15 and the input 14 of said amplification stage.

Figures 2A, 2B, 2C, 2D, 2E, 2F:
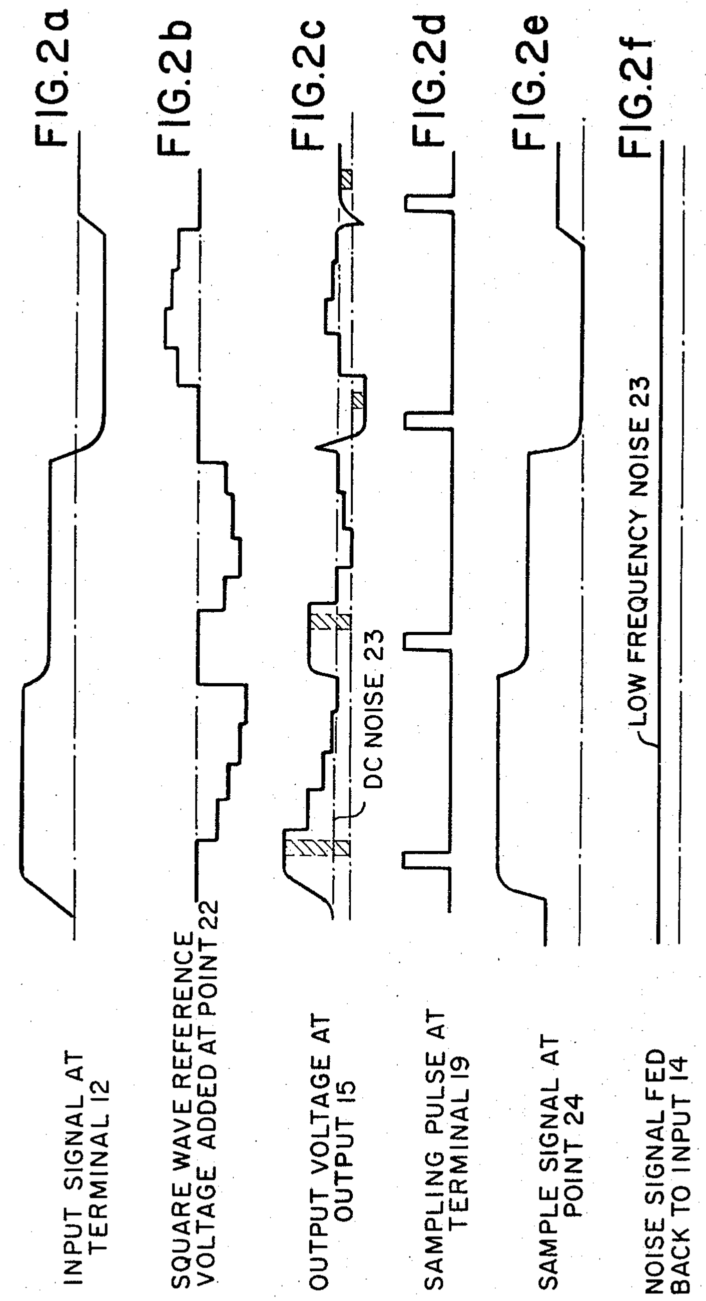

The feedback loop 17 comprises a signal deriving circuit 18 connected to the output 15 of the amplification stage 11. The signal deriving circuit 18 may comprise any suitable circuit for deriving a low frequency noise signal beyond the time period of the output signal of the amplification stage 11 as a sample value of said output signal. The noise signal derived from the output signal of the amplification stage 11 is in a time period which does not include signal data of the time period of the input signal. A sampling pulse, as shown in FIG. 2*d*, is supplied to the signal deriving circuit 18 via an input terminal 19.

A low pass filter 21 is connected in the feedback loop 17 between the signal deriving circuit 18 and the input 14 of the amplification stage 11. The low pass filter 21 may comprise any suitable filter for deriving the DC drift component from the noise signal. The DC drift component is applied to the input 14 of the amplification stage 11. The DC drift component is a noise component beyond the bandwidth of the sampled signal, beyond the time period of the sampled signal and beyond its cut off frequency. The frequency of the sampling pulse supplied via the input terminal 19 is less than the minimum frequency in the band of the input signal.

If the gain of the DC amplifier 11 is $\mu$, the transfer characteristic or admittance of the signal deriving circuit 18 is $\beta 1$, and the transfer characteristic or admittance of the low pass filter 21 is $\beta 2$, the gain of the entire amplifier from input 14 to output 15 including the feedback loop 17 is $$G=\frac{\mu}{1-\mu\beta 1\beta 2}$$

When the feedback volume of the feedback loop $\mu\beta 1\beta 2$ is sufficiently large compared with 1, the previous equation becomes $$G=G1\simeq\frac{1}{\beta 1\beta 2}$$

When the feedback volume of the feedback loop $\mu\beta 1\beta 2$ is sufficiently small compared with 1, the equation becomes $$G=G2\simeq\mu$$

Since $\mu$ is the gain of the DC amplifier 11, it may be assumed to have a large value over the entire frequency band. By utilization of a voltage storing circuit in the output of the signal deriving circuit 18, the admittance $\beta 1$ of said signal deriving circuit may be made approximately equal to 1 at a frequency sufficiently lower than the frequency of the sampling pulse. Furthermore, the admittance $\beta 2$ of the low pass filter 21 may be made approximately equal to 1 at a frequency lower than the cut off frequency of the sampling pulse.

The overall amplifier gain G thus indicates a high amplification stage 11 gain $\mu$ within the transmission band including signal data, but indicates a very low gain of $$\frac{1}{\beta 1\beta 2}\simeq 1$$

in the low frequency band which includes the DC drift component of the amplifier beyond the signal data band. That is, although the input signal is amplified $\mu$ times, the DC drift component is hardly amplified, and the ratio of equivalent signal to noise at the input 14 is improved approximately $\mu$ times at the output 15.

FIGS. 2*a*, 2*b*, 2*c*, 2*d*, 2*e* and 2*f* illustrate the waveshapes appearing at various points in the arrangement of FIG. 1. The waveshapes of FIGS. 2*a* to 2*f* are those which appear when the arrangement of FIG. 1 is utilized as the adding amplifier of a feedback analog-digital converter, for the purposes of illustration. The input signal at the input terminal 12 is illustrated in FIG. 2*a*. The input signal of FIG. 2*a* is a time division multiplex analog signal which is to be converted.

FIG. 2*b* illustrates the square wave reference voltage of the converted signal, which is added to the input signal of FIG. 2*a* at a point 22 of FIG. 1. The input signal and square wave reference voltage are added in a manner whereby the resultant sum becomes zero, and square wave voltages are successively produced.

The output voltage of the amplifier at the output 15, including DC noise 23 arising in the amplifier, is illustrated in FIG. 2*c*. The output voltage of FIG. 2*c* is the sum of the analog signal of FIG. 2*a* and the square wave reference voltage of FIG. 2*b*. The sampling pulse applied at the terminal 19 is illustrated in FIG. 2*d*. The sampling pulse samples time periods beyond the time period of the output signal of the amplifier, that is, time periods which do not include signal data in the time period of the square wave reference voltage of FIG. 2*b*. In an analog-digital converter, a time period beyond the time period of the output signal of the amplifier is one between the completion of one conversion operation and the beginning of the next succeeding conversion operation. In the conversion of telephone signals into pulse code modulation, such time period is utilized for a ringing signal or for a synchronizing signal. Sampling of time periods beyond the time period of the output signal of the amplification stage 11 is accomplished with facility.

The sample signal provided by the signal deriving circuit 18, and appearing at a point 24, is illustrated in FIG. 2*e*. The sample signal at the point 24 includes the input analog signal supplied to the input terminal 12 and the low frequency noise generated by the amplifier. The analog signal is filtered out by the low pass filter 21. In an encoder or analog-digital converter, which converts a time division multiplex signal, such as an audio signal, into a digital code, such as a pulse code modulated signal, the input analog signal is often a pulse amplitude modulated signal of a polarity which does not include a DC signal. Thus, signal data is not included in the lowest frequency of the audio band, such frequency having a magnitude, for example, of less than 300 cycles per second. The low pass filter 21 transmits only the less-than-lowest frequency band, so that only the low frequency noise including the DC generated by the amplifier appears at the output of said low pass filter, as illustrated in FIG. 2*f*, and is applied to the input 14 of said amplifier.

FIG. 3 is a circuit diagram of the DC amplifier stabilization circuit of the present invention. In FIG. 3, the amplification stage or amplifier 11 may comprise any suitable amplifier of any suitable number of amplification stages. The amplification stage 11 may comprise a plurality of cascade-connected transistors 27, 28 and 29, each having a suitable bias voltage applied to it via a corresponding one of a plurality of bias resistors 31, 32 and 33. The over-all voltage gain of the amplification stage 11 is $\mu$.

The signal deriving circuit 18 comprises a sample signal deriving circuit **18*a* and a sample signal storing circuit 18*b*. The sample signal deriving circuit 18*a* may comprise a diode bridge 34 having an input terminal 35 to which the output signal of the amplification stage 11 is applied, input terminals 36 and 37** to which the sampling pulse shown in FIG. 2*d* is applied via the terminals 19, and an output terminal 38 at which the sample signal shown in FIG. 2*e* is provided. The diode bridge 34 comprises diodes **34*a*, 34*b*, 34*c* and 34*d***.

The sampling pulse shown in FIG. 2*d* and applied to the terminals 19 of the sample signal deriving circuit **18*a*** is a square wave pulse which, when mixed with the square wave reference voltage component of the output signal of the amplifier shown in FIG. 2*c*, removes said reference voltage component so that only the input signal component shown in FIG. 2*a* remains as the sample signal shown in FIG. 2*e*. The sample signal storing circuit **18*b* may comprise a capacitor 39 which stores the sample signal provided at the output terminal 38 of the diode bridge 34**.

The low pass filter 21 removes the high frequency input signal component shown in FIG. 2*a* from the sample signal shown in FIG. 2*e* provided at the point 24 by the storing capacitor 39. Thus, only the DC drift component of the sample signal is passed by the low pass filter 21. Any suitable low pass filter circuit may be utilized as the low pass filter 21. Thus, for example, a T-type RC filter, a T-type LC filter, a $\pi$-type LC filter, and the like, may suitably comprise the low pass filter 21.

The low pass filter 21 may comprise, for example, a $\pi$-type RC filter comprising series-connected resistors 41, 42 and 43 and parallel-connected capacitors 44 and 45. The cut off frequency of the filter 21 is determined by the resistor 41 and the capacitor 44 and the resistor 42 and the capacitor 45. The transfer admittance of the filter is the inverse of the sum of the resistances of the resistors 41, 42 and 43.

The DC drift component provided by the filter 21, as shown in FIG. 2*f*, is applied to the input 14 of the amplification stage 11 via a line 46.

While the invention has been described by means of a specific example and in a specific embodiment, we do not wish to be limited thereto, for obvious modifications will occur to those skilled in the art without departing from the spirit and scope of the invention.

We claim:

1. A stabilization circuit for a DC amplifier having an amplification stage, an input for supplying an input signal to said amplification stage and an output for deriving an output signal from said amplification stage, said input signal including a high frequency input signal component and a signal component having a time slot of no information and said output signal including a high frequency input signal component, a signal component having a time slot of no information and a low frequency noise component, said stabilization circuit comprising circuit means for sampling said output signal during said time slot of no information to thereby sample said noise component and said high frequency signal component from said output signal, circuit means for eliminating the high frequency signal component from the sampled output signal and means for applying the noise component of the sampled output signal to the input of said amplification stage.

2. A stabilization circuit for a DC amplifier as claimed in claim 1, wherein said noise component constitutes a DC drift component.

3. A stabilization circuit for a DC amplifier as claimed in claim 1, wherein said means for sampling said output signal comprises sample signal deriving means and sample signal storing means for storing said sample signal after it is derived by said sample signal deriving means.

4. A stabilization circuit for a summing amplifier of a coder having an input terminal for supplying input signals to said amplifier and an output terminal for deriving output signals from said amplifier, said input signals including pulse amplitude modulated high frequency signals to be coded and reference voltage signals having a time slot of no information for coding, said high frequency and reference voltage signals being added and amplified by said summing amplifier, and said output signals including pulse amplitude modulated high frequency signals, reference voltage signals having a time slot of no information and a low frequency noise component, said stabilization circuit comprising circuit means for sampling said output signals during said time slot of no information to thereby sample said noise component and said pulse amplitude modulated high frequency signals from said output signals, low pass filter means for filtering the sampled output signals to eliminate the pulse amplitude modulated high frequency signals and means for applying the noise component of the sampled output signals to the input terminal of said amplifier.

References Cited

UNITED STATES PATENTS

| | | | |
|---|---|---|---|
| 2,619,552 | 1/1952 | Kerns | 330—97 X |
| 2,901,563 | 8/1959 | McAdam et al. | 330—9 |
| 3,047,815 | 7/1962 | Boose | 330—97 X |
| 3,070,786 | 12/1962 | MacIntyre | 330—9 X |
| 3,176,236 | 3/1965 | Abbott et al. | 330—25 |
| 3,241,082 | 3/1966 | Van Ligten et al. | 330—149 X |

ROY LAKE, *Primary Examiner.*

J. B. MULLINS, *Assistant Examiner.*